Patented May 22, 1934

1,960,185

UNITED STATES PATENT OFFICE 1,960,185

HIGHLY FLEXIBLE SHEETING AND PROCESS OF PREPARING THE SAME

Carl J. Malm, Rochester, N. Y., assignor to Eastman Kodak Company, Rochester, N. Y., a corporation of New York No Drawing. Application September 10, 1932, Serial No. 632,561

22 Claims. (Cl. 18—57)

The present invention relates to highly flexible sheeting prepared by coating out a skin from a solution of slightly hydrolyzed cellulose acetate propionate in a solvent consisting of propylene chloride and a lower alcohol, particularly methyl alcohol.

The preparation of sheets or skins of organic cellulose esters coated out from acetone or the like is well-known, in fact most of the sheeting of that nature which is employed for non-inflammable photographic film, wrapping material etc. at the present time is produced by coating out from acetone solution. The most common organic ester of cellulose employed is the acetate which usually must be hydrolyzed to acetone-solubility before use. In the case of a high grade cellulose acetate a skin or sheet thereof, coated out from acetone, having a thickness of approximately .005 in. may exhibit an average flexibility of approximately 6 folds on a modified Schopper fold-tester (the common method of determining the flexibilities of sheets). However, this flexibility is unusual and as a general rule the flexibility of cellulose acetate sheets coated from acetone is about 3–4 folds.

One object of my invention is to prepare a sheet or skin of an organic cellulose ester which has flexibility properties far above and beyond those exhibited by the organic cellulose ester sheets which are employed commercially at the present time. Another object of my invention is to prepare a sheet or skin of an organic ester of cellulose which when unplasticized will exhibit flexibilities equal or superior to that exhibited by organic cellulose ester sheets or skins which have been plasticized. Another object of my invention is to employ a slightly hydrolyzed cellulose acetate-propionate in the preparation of sheets which are super-flexible, which ester has been found to give non-flexible sheets when coated out from acetone. Other objects will appear herein.

I have found that a slightly hydrolyzed cellulose acetate-propionate having a propionyl content of at least 10% (based on the ester) and in which at least ½ of 1% and not more than 6% of the combined acyl content of the ester has been hydrolyzed off or replaced by hydroxyl groups may, when dissolved in a solvent consisting of propylene chloride and a lower alcohol, the former in predominating proportions, form sheets or skins of surprisingly high flexibility. I have found that the sheets or skins prepared in this manner exhibit flexibilities, though the products are unplasticized, which are equal or superior to those of sheets of plasticized organic esters of cellulose. I have found that by my invention, sheets consisting of slightly hydrolyzed cellulose acetate-propionate alone have flexibilities higher than the plasticized sheets containing organic esters of cellulose known at the present time. I have found that the addition of a plasticizer to my product does not markedly affect its flexibility thus tending to show that the conditions induced by a plasticizer in the common run of cellulose ester products are already present in my product without the necessity of diluting or adulterating the cellulose ester with an added plasticizer.

My invention comprises the colloidizing of a slightly hydrolyzed cellulose acetate-propionate with a solvent consisting of propylene chloride and a lower alcohol, especially methyl alcohol, the former being present in a predominating amount. I have found that the solvent mixtures consisting of 70 to 90% propylene chloride and the remainder of methyl alcohol are unusually effective in the preparation of sheets of great flexibility.

The following data illustrate the unusual results which are obtained by preparing sheets or skins according to my invention:

A slightly hydrolyzed cellulose acetate-propionate prepared by hydrolyzing for about 100 hours according to the disclosure of Malm and Fletcher application Serial No. 551,546, filed July 17, 1931 and which contained about 15% propionyl and 26% acetyl (based on the ester) was coated out in the form of a sheet from a propylene chloride-methyl alcohol solvent, in each different case varying the proportions of the two components. The solution was made up in the proportion of 1 part of ester to 6 parts by weight of solvent. The results obtained were tabulated as follows:

| Ratio propylene chloride to methyl alcohol | Thickness of sheet (thousandths of an inch) | Flexibility or fold tolerance |
|---|---|---|
| 90:10 | 5 11/16 | 30–40 |
| 85:15 | 5¼ | 35–45 |
| 80:20 | 5 15/16 | 10–15 |
| 75:25 | 5½ | 10–15 |
| 70:30 | 6 | 8–12 |

It was desired to determine the effect of a plasticizer in increasing the flexibility of the sheets coated out by the present invention. The additional flexibility obtained when a plasticizer was employed was not marked as illustrated by the following data:

| Ratio propylene chloride to methyl alchohol | Plasticizer | Thickness (thousandths of an inch) | Flexibility or fold tolerance |
|---|---|---|---|
| 90:10 | None | 5½ | 30–40 |
| 90:10 | 15% triphenyl phosphate | 5¼ | 30–40 |
| 85:15 | None | 5¼ | 35–45 |
| 85:15 | 15% triphenyl phosphate | 5¼ | 35–45 |

The theory might be advanced that the exceptional flexibility of the skins or sheets in my invention might be due to the presence of residual solvent in the skins which acts as a plasticizer therein. In order to determine the truth or falsity of that theory some of the skins of the preceding example were kept at a temperature of 100 degrees C. for 4 days, whereupon they were conditioned for 24 hours at a temperature of 20° C. and a relative humidity of 40%. The skin in the previous example which had been coated from the 90:10 propylene chloride-methyl alcohol solvent and containing no plasticizer exhibited after this conditioning treatment, a fold tolerance of 20–30 while the skin in that example coated from the same solvent but containing the triphenyl phosphate exhibited, after conditioning, an average fold tolerance of 25–35. The skin which had been coated from the 85:15 propylene chloride-methyl alcohol mixture after this treatment exhibited an average fold tolerance of 25–35. It was to be expected that upon the conclusion of the severe drying conditions imposed upon the skin the flexibility would be less; however, this small decrease was about what would be expected from completely drying the skin and the results show that the residual solvent in the original skin plays but little part in the high flexibilities obtained in the present invention.

I have found that methyl alcohol gives the highest flexibilities when employed as the lower alcohol in our solvent mixture and it is preferred for use in this capacity; however, other lower alcohols may be employed to form sheets of high flexibility. Respective skins were coated from propylene chloride mixed with various lower alcohols and the following results were recorded:

| Ratio of propylene chloride to alcohol | Alcohol employed | Thickness (thousandths of inch) | Flexibility or fold tolerance |
|---|---|---|---|
| 90:10 | Methyl | 5 | 30–40 |
| 80:20 | Methyl | 4⅞ | 15–25 |
| 90:10 | Ethyl | 5 | 10–20 |
| 80:20 | Ethyl | 4⁵⁄₁₆ | 10–20 |
| 90:10 | Normal propyl | 4⅝₁₆ | 15–25 |
| 80:20 | Normal propyl | 4¹³⁄₁₆ | 8–12 |
| 90:10 | Iso-propyl | 4¾ | 10–15 |
| 80:20 | Iso-propyl | 4¾ | 10–15 |
| 90:10 | Normal butyl | 4⁹⁄₁₆ | 10–15 |
| 80:20 | Normal butyl | 4⅞ | 10–20 |
| 90:10 | Iso-butyl | 5 | 8–12 |
| 80:20 | Iso-butyl | 5 | 10–20 |
| 80:20 | Tertiary butyl | 4¾ | 10–20 |

In some cases in the above results the flexibility of the skin may be lower than it should be due to the skin not being stripped from the coating surface before it is completely cured. I have found that when cellulose derivative skins or sheets (especially of the organic esters of cellulose) are stripped from the coating surface before they are completely cured, the resulting skins exhibit a tolerance for many more folds than is the case with skins which are completely cured while on the coating surface.

The various advantages of the sheet or skin produced by my process over those which are employed at the present time are apparent. For example the sheets produced by my invention need not be plasticized to procure greatly superior flexibilities so that the reclamation of scrap sheeting which has been made by my process creates no problem of separating various materials to obtain the cellulose ester in pure form that is presented by the reclamation of cellulose esters which must be plasticized to obtain sheets of satisfactory flexibility. Also there is no danger in the case of the sheets produced by my process of a decrease in flexibility of the sheets due to a loss of plasticizer as the flexibility is an inherent quality of the sheet produced according to my invention and not due to the addition of any added material.

As was pointed out heretofore the term "slightly hydrolyzed cellulose acetate-propionate" employed herein refers to a cellulose acetate-propionate having a propionyl content of at least 10% (based on the ester) and which has been hydrolyzed to a point that at least ½ of 1% and not more than 6% of the combined acyl content has been hydrolyzed off.

The sheets produced according to my process may be used in any instance where cellulose ester sheeting is employed at the present time. Due to its high flexibilities it is valuable for the manufacture of photographic film and of thin sheeting, for wrapping purposes. These sheets due to their toughness are adapted for reinforcing materials especially those of a breakable nature such as paper, glass, wood as well as leather, metal, etc. My invention may also be employed for other purposes than making sheets or skins such as artificial silk manufacture, lacquering and overcoating in general, artificial leather, etc. Various other uses of the present invention will suggest themselves to those skilled in the art.

If desired, various materials which are compatible may be added in the preparation of products according to my invention. For instance, triphenyl phosphate may be added to reduce inflammability. Although unnecessary, if the operator desires, he may add a known plasticizer, cellulose esters, resins or other comparable plastic materials to impart to the resulting product the characteristics desired.

It will be seen that all of the sheets produced according to our invention in the above examples exhibited a fold tolerance of more than 8 folds and that the more flexible sheets exhibited a flexibility of at least 30 folds.

I claim as my invention:

1. The process which comprises colloidizing slightly hydrolyzed cellulose acetate propionate with a solvent comprising a major proportion of propylene chloride and a minor proportion of a lower alcohol.

2. The process of preparing highly flexible sheeting which comprises dissolving a slightly hydrolyzed cellulose acetate-propionate in a propylene chloride-lower alcohol mixture in which the propylene chloride predominates, and depositing the resulting solution on a film-forming surface.

3. The process of preparing highly flexible sheeting which comprises dissolving a slightly hydrolyzed cellulose acetate-propionate in a propylene chloride-methyl alcohol mixture in which the propylene chloride predominates, and depositing the resulting solution on a film-forming surface.

4. The process of preparing highly flexible sheeting which comprises dissolving a slightly hydrolyzed cellulose acetate-propionate in a solvent mixture consisting of 90–70% propylene chloride and the remainder a lower alcohol, and depositing the resulting solution on a film-forming surface.

5. The process of preparing highly flexible sheeting which comprises dissolving a slightly hydrolyzed cellulose acetate-propionate in a solvent mixture consisting of 90–70% propylene chloride and the remainder methyl alcohol, and depositing the resulting solution on a film-forming surface.

6. The process of preparing highly flexible sheeting which comprises dissolving a slightly hydrolyzed cellulose acetate-propionate having a propionyl content of about 15% in a propylene chloride-lower alcohol mixture in which the propylene chloride predominates, and depositing the resulting solution on a film-forming surface.

7. The process of preparing highly flexible sheeting which comprises dissolving a slightly hydrolyzed cellulose acetate-propionate having a propionyl content of about 15% in a propylene chloride-methyl alcohol mixture in which the propylene chloride predominates, and depositing the resulting solution on a film-forming surface.

8. A composition of matter comprising a slightly hydrolyzed cellulose acetate-propionate dissolved in a solvent therefor comprising a major proportion of propylene chloride and a minor proportion of a lower alcohol.

9. A composition of matter comprising a slightly hydrolyzed cellulose acetate-propionate dissolved in a solvent therefor consisting of 90%–70% of propylene chloride and the remainder a lower alcohol.

10. A composition of matter comprising a slightly hydrolyzed cellulose acetate-propionate dissolved in a solvent therefor consisting of 90%–70% of propylene chloride and the remainder methyl alcohol.

11. A composition of matter comprising a slightly hydrolyzed cellulose acetate-propionate having a propionyl content of about 15% dissolved in a propylene chloride-alcohol mixture in which the propylene chloride predominates.

12. A composition of matter comprising a slightly hydrolyzed cellulose acetate-propionate having a propionyl content of about 15% dissolved in a solvent therefor consisting of 90%–70% of propylene chloride and the remainder methyl alcohol.

13. A highly flexible sheet resulting from the coating out of a slightly hydrolyzed cellulose acetate-propionate from its solution in a solvent comprising propylene chloride and a lower alcohol in which the propylene chloride predominates.

14. A highly flexible sheet resulting from the coating out of a slightly hydrolyzed cellulose acetate-propionate having a propionyl content of about 15% from its solution in a solvent comprising propylene chloride and a lower alcohol, the propylene chloride being present in a predominating proportion.

15. A highly flexible sheet resulting from the coating out of a slightly hydrolyzed cellulose acetate-propionate from its solution in a solvent comprising a propylene chloride and methyl alcohol in which the propylene chloride predominates.

16. A highly flexible sheet resulting from the coating out of a slightly hydrolyzed cellulose acetate-propionate having a propionyl content of about 15% from its solution in a solvent comprising propylene chloride and methyl alcohol, the propylene chloride being present in a predominating proportion.

17. A highly flexible sheet resulting from the coating out of a slightly hydrolyzed cellulose acetate-propionate from its solution in a solvent consisting of 70%–90% propylene chloride and the remainder of methyl alcohol.

18. A highly flexible sheet resulting from the coating out of a slightly hydrolyzed cellulose acetate-propionate having a propionyl content of about 15% from its solution in a solvent consisting of 70%–90% propylene chloride and the remainder of methyl alcohol.

19. The process which comprises colloidizing a cellulose acetate propionate, which has a propionyl content of at least 10% and from which has been hydrolyzed off at least ½% of 1% and not more than about 6% of the acyl content, with a solvent comprising a major proportion of propylene chloride and a minor proportion of a lower alcohol.

20. The process of preparing highly flexible sheeting which comprises dissolving a cellulose acetate propionate, which has a propionyl content of at least 10% and from which has been hydrolyzed off at least ½ of 1% and not more than about 6% of the acyl content, in a solvent comprising a major proportion of propylene chloride and a minor proportion of a lower alcohol and depositing the resulting solution on a film-forming surface.

21. A composition of matter comprising a cellulose acetate propionate, which has a propionyl content of at least 10% and from which has been hydrolyzed off at least ½ of 1% and not more than about 6% of the acyl content, dissolved in a solvent therefor comprising a major proportion of propylene chloride and a minor proportion of a lower alcohol.

22. A highly flexible sheet resulting from the coating out of a cellulose acetate propionate, which has a propionyl content of at least 10% and from which has been hydrolyzed off at least ½ of 1% and not more than about 6% of the acyl content, from its solution in a solvent comprising a major proportion of propylene chloride and a minor proportion of a lower alcohol.

CARL J. MALM.